Feb. 16, 1971 R. H. WEICHSEL 3,563,620

FLUID SEALS

Filed Oct. 28, 1968

INVENTOR.
RICHARD H. WEICHSEL
BY John Mahoney
attorney

United States Patent Office 3,563,620
Patented Feb. 16, 1971

3,563,620
FLUID SEALS
Richard H. Weichsel, Hudson, Ohio, assignor to The Apex Bearings Company, a corporation of Ohio
Filed Oct. 28, 1968, Ser. No. 787,284
Int. Cl. F16c *1/24*
U.S. Cl. 308—36.3                9 Claims

ABSTRACT OF THE DISCLOSURE

The combination of a shaft and a fluid seal including a housing surrounding the shaft and having a curved outer wall and a circular inwardly extending spaced first and second side walls, the second side wall being longer and thicker than the first side wall and having a circular offset portion arranged inwardly of the peripheral free end of the first side wall. The second side wall has a grooved inner periphery to receive a plastic O-ring having a low coefficient of friction. The housing also includes a porous collar having one end portion extending into and being secured to the offset portion of the second side wall and its other end portion engaging and being secured to the periphery of the free end of the first side wall to provide a circular channel to receive fluid which may be passed through the porous collar to form a fluid seal around the shaft.

The seal may be utilized in combination with a bearing for supporting the shaft and means secured to the seal and a machine housing is provided to maintain the seal spaced from but in close tolerance with the shaft with the longer and thicker side wall arranged adjacent to one side of the bearing and with the plastic O-ring on the inner portion of the thicker side wall protruding from the wall and engaging the shaft to prevent contaminants from passing into the bearing and for retaining the original lubricant provided by the manufacturer. If the bearing is open on both sides, a similar seal may be arranged on the opposite side of the bearing in which case the side walls of the second seal are reversed relative to the side walls of the first seal so that fluid passing through the porous collar of the second seal forms a fluid seal around the shaft which is passed along the shaft in a direction away from the bearing which is opposite to the direction that the fluid is passed along the shaft from the first seal.

---

My invention relates to fluid seals for use in combination with a shaft and more particularly to fluid seals for bearings which are supported by the shaft and a machine housing. It also relates to the combination of a fluid seal and a bearing in which the fluid seal not only prevents or minimizes the entrance of contaminating particles into the bearing but also aids in retaining the lubricant provided by the original manufacturer which is usually the most suitable for the load speed condition in which the bearing unit is designed to run.

In bearings for shafts in which the shaft is of the roundway or linear action type and particularly of the rotating element type, such as ball, needle, roller, or tapered roller bearings, considerable difficulty is encountered because contaminants which may be of a solid, liquid, or gaseous material, enter the bearing during linear or rotative movement of the shaft, part of which bearing is supported by the shaft and part of which is supported by a machine housing. In many such cases, the lubricant may be lost or the entrance of contaminating particles, such as dirt, may increase the linear or rotational friction to a point where the temperature build up changes the running clearance of the movable units and causes early failure.

In an attempt to overcome this deficiency, manufacturers of bearings have provided seals of the single or double lip type on one or both sides of the bearings. Such bearings, however, are not entirely satisfactory and failures frequently occur. In accordance with the present invention, I have provided a fluid seal which may be utilized with bearings of any desired type but which is particularly useful in association with bearings of the rolling element type.

It is therefore an object of the present invention to provide improved means for producing a fluid seal by means of which a fluid may be passed around a movable member, such as a shaft, to provide a pneumatic or hydraulic curtain for preventing the entrance of contaminating particles into the bearing for the shaft.

Another object of my invention is to provide a fluid seal surrounding a shaft in combination with a bearing, part of which bearing is supported by and is movable with the shaft and part of which is supported by a machine housing which seal serves to prevent the passage of contaminants into the bearing and also acts to retain the lubricant provided by the bearing manufacturer which lubricant is usually the most suitable for the load speed condition in which the bearing is designed to run.

A still further object of my invention is to provide a fluid seal in the form of a pneumatic or hydraulic curtain around a shaft in combination with a bearing, part of which bearing is supported by the shaft and part of which is supported by the machine housing which curtain prevents the entrance of contaminants into the bearing and enables a lubricant of the Oil-Mist type to be retained in the bearings which lubricant is provided by the bearing manufacturer and is usually the most suitable for the load speed condition in which the bearing unit is designed to run.

My invention will be better understood by reference to the accompanying drawings in which.

Figure 1:
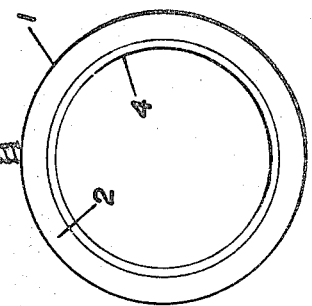
FIG. 1 is a side elevational view of my improved fluid seal.
Figure 2:
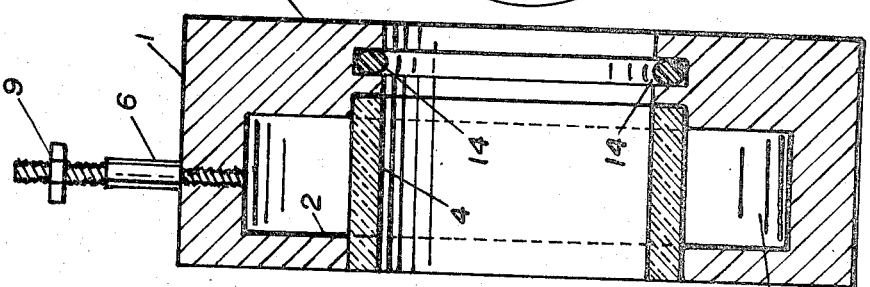
FIG. 2 is a cross sectional view on an enlarged scale taken on a central plane through the seal shown in FIG. 1.

My improved fluid seal may be made in any desired configuration. For instance, it may be designed for roundway or flatway linear sealing characteristics with bearings of any desired type and particularly with bearings in which the lubricant is in the form of an Oil-Mist. Essentially, it consists of a housing shaped to provide one or more channels for receiving a fluid, such as air, nitrogen, carbon dioxide, water or a light bodied liquid, such as a brake fluid, and a porous collar, the channel or channels being arranged to permit access of the fluid to not more than 95% nor less than 5% of the porous collar. Conduit means are also provided for passing the fluid into the channel or channels. For this purpose, one or more connections may be provided between a conduit means and the housing for passing a fluid into the channel or channels and through the porous collar to form a seal around a shaft to which the seal is applied. In my improved seal, the housing is so shaped that a substantial portion of the fluid passed through the collar is blocked in its flow toward the bearing and additional means are provided for preventing substantially all of the fluid passing through the porous collar from flowing into access with the bearing.

For purposes of illustration, my improved seal is not only shown separately but in combination with a bearing of the rotative element type and consists of a housing having an outer circular wall 1 and spaced side walls 2 and 3, the side wall 3 being somewhat longer than and considerably thicker than the side wall 2 and is provided with an offset circular portion to receive one edge of a circular collar 4 which is composed of a porous material and which forms in conjunction with the side walls 2 and 3 a channel 5 for receiving a fluid which may be introduced into the channel 5 through the outer wall 1 of the housing and communicates with the channel. The housing including the collar 4 is circular in shape and surrounds the shaft 7 from which it is spaced and although I do not desire to be limited to the diametrical clearance between the collar 4 and the shaft 7, it may range from approximately .001 to .015 of an inch. A dimetrical clearance of approximately .002 of an inch over the greatest shaft dimensional size is usually satisfactory.

To maintain the collar 4 at the desired clearance from the shaft, the seal may be supported in any desired manner. As shown, the duct means 6 extends through an aperture in the machine housing 8 and is secured thereto in any desired manner, such as by a nut 9, the outer end of which nut is provided with suitable means, such as threads, to which a hose or conduit means leading from a suitable fluid supply under pressure is connected. In my improved fluid seal, the housing may be formed of a suitable metal, such as bronze, steel, or aluminum, or it may be formed of a plastic material, such as a phenolic condensation product.

The porous collar may be formed of any suitable material which affords sufficient feed therethrough to provide a substantially uniform fluid seal between the collar and the shaft. For instance, the porous collar may be composed of a sintered copper-tin mixture, such as approximately 90% copper and 10% tin, or it may be composed of a sintered iron-copper mixture in which the iron constitutes approximately 90% and the copper constitutes approximately 10%, or the metal ingredients may be a mixture of iron, chromium and nickel in the proportions of approximately 10% to 25% chromium, 7% nickel and the remainder iron as in stainless steel. In such cases the metal ingredients may be in the form of round or spherically-shaped pellets which may be pressed together and sintered at a sufficient temperature to fuse the metal having the lower or lowest melting point. The rounded pellatized metal may also be in the proportions present in Monel which consists of approximately two-thirds of nickel and one-third of copper. In preparing the porous collar, the rounded of spherically-shaped ingredients are pressed together and sintered at a sufficient temperature to fuse the copper. When formed in the manner specified, the porous collar consists of a network of tortuous interconnected passage ways of a venturi-shaped type in which the pores may be present in an amount up to 95% of the volume of the collar. Usually, however, the pores do not constitute more than approximately 20% to 25% by volume of the collar.

The collar may also be formed of a porous ceramic material, or of a native stone, which may be crushed and pressed together to form intricate tortuous passageways.

In preparing my improved seal, and particularly when the porous collar is formed of a metal, the inside diameter of the sides of the housing which are engaged by the collar and the outside diameter of the porous collar should be substantially equal although they may each vary .00025 of an inch from its nominal diameter. In such case, the collar may be cooled to a temperature of approximately 0° Fahrenheit and the housing may be heated to a temperature of approximately 250° Fahrenheit. The housing may then be slipped over the porous collar and the assembly allowed to attain room temperature. The ceramic material when utilized in forming the porous collar may be secured to the sides of the housing in substantially the same manner.

Although my improved seal may be used in conjunction with all types of bearings, such as ball, roller, barrel roller, or linear motion ball, for purposes of illustration it is shown in combination with ball bearings including an inner race 10 carried by the shaft 17 and an outer race 11 supported in a machine housing with the usual balls arranged between the inner and outer races.

Figure 3:
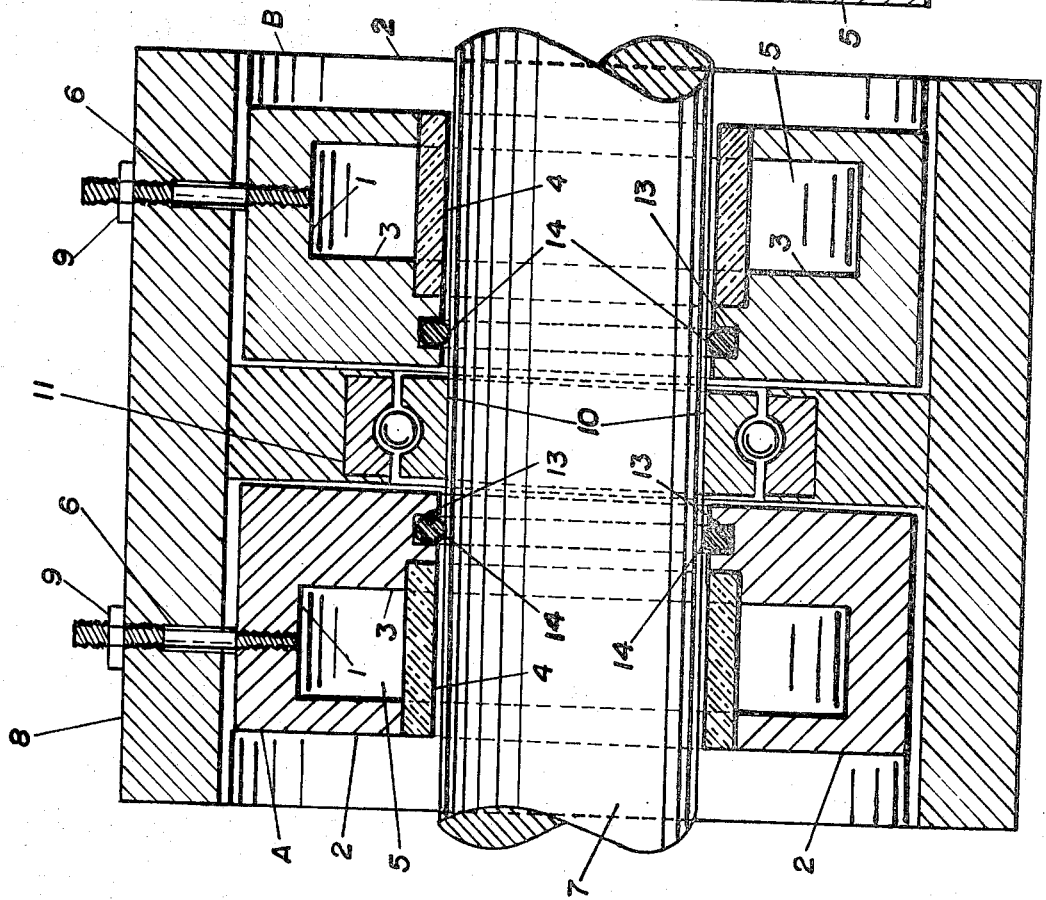
FIG. 3 is an enlarged cross sectional view of a pair of such seals arranged on opposite sides of a bearing of the rotatable type.

When a fluid, such as air, nitrogen, carbon dioxide, water, or a light bodied brake liquid, is passed through the porous collar of the seal surrounding the shaft at the left hand side of the bearings as shown in FIG. 3 and designated by the letter A, it will form a pneumatic or hydraulic curtain around the shaft but because the side wall 3 of the housing 1 is longer than the side wall 2 and extends even with the bottom of collar 4, it serves to block most of the fluid from passing into the bearing. When the lubricant in the bearing is of the Oil-Mist type, however, it is desirable to block all, or substantially all of the fluid passing through the porous collar from passing into contact with the bearing. For this purpose, the inner portion of the wall 3 has a groove 13 in its lower portion to receive a low slip/stick sealing ring 14 that may be formed of a suitable plastic material, such as rubber, and which engages the shaft to block the passage of a fluid to the bearing. Preferably, however, the sealing ring is formed of a material having a low coefficient of friction with the shaft, such as a synthetic polymeric amide, usually referred to as nylon, or a polymeric tetrafluoroethylene commonly known as Teflon. The groove may be of any desired shape, such as semicircular, or it may have a V-shaped or a square bottom portion. Preferably, the groove is rectangular in shape so that when the plastic O-ring engages the shaft, it will be pushed into the corners of the rectangularly-shaped groove as shown in FIG. 3 of the drawing.

The side wall 3 of the seal on the opposite side of the bearings which bearing is designated by the letter B, also extends even with its porous collar which blocks most of the fluid from passing into the opposite side of the bearing and a groove 13 of the semicircular, V or rectangular shape is provided in the bottom of the side wall 3 of the second seal into which a similar ring 14 having a low coefficient of friction is received which forms a sealing engagement with the shaft 7 and prevents the fluid from passing into engagement with the bearing. When the plastic O-ring in the groove 13 of the second groove engages the shaft, the plastic material is forced into the corners of the groove in the same manner as in the first seal.

It will of course be understood that in the event one side of the bearing is closed, only a single seal is necessary.

What is claimed is:

1. The combination of a shaft and a fluid seal therefor including a housing composed of a substantially circular outer wall and first and second inwardly extending spaced circular side walls surrounding said shaft, the second circular side wall of the housing being longer than the first circular side wall and having a circular offset portion therein, a circular porous collar having one end portion extending into the circular offset portion of the second side wall and being secured thereto and its other end portion engaging and being secured to the inner periphery of the first side wall and forming with said side walls a circular channel, means for maintaining said housing in a substantially uniform spaced relation relative to the shaft but in close tolerance therewith, means for passing a fluid into the channel of said housing and through said porous collar around said shaft, and the inner periphery of said second wall having an annular groove therein, a circular plastic O-ring in said groove which protrudes a sufficient distance therefrom so that when said housing is applied to said shaft, the circular O-ring will be in slipping engagement with said shaft when the shaft is rotated to thereby block the passage of fluid from said seal beyond the O-ring.

2. The combination as defined in claim 1 in which the groove in the inner periphery of the second wall is rectangular in shape and the O-ring is formed of a resilient plastic material which is forced into the corners of said groove by said shaft.

3. The combination as defined in claim 1 in which the second side wall of the housing is subtsantially thicker than the first side wall.

4. The combination as defined in claim 1 in which said fluid is air which upon passing through said collar forms a pneumatic curtain around said shaft and in which the O-ring protrudes a sufficient distance from the inner periphery of the second wall of said housing to block the passage of air in one direction along said shaft.

5. The combination of a shaft, a bearing for said shaft having a lubricant therein, and a seal surrounding said shaft, said seal including a housing having an outer curved wall and first and second curved inwardly extending spaced side walls with the second side wall being arranged in proximity to one side of said bearing and being provided with an offset circular portion and an annular porous collar having one end arranged within the offset portion of the second side wall and being secured thereto with its opposite end portion engaging and being secured to the inner periphery of the first side wall to form a channel, means for maintaining said seal in spaced relation to but in close tolerance relative to said shaft, means for passing a fluid into said channel and through said collar to form a fluid seal around said shaft, said second wall having an annular groove in its inner periphery, and a plastic O-ring having its inner portion arranged in said groove and projecting from the inner portion of the second wall into slipping engagement with said shaft during rotation of said shaft to prevent fluid from said seal from passing into said bearings.

6. The combination as defined in claim 5 in which the fluid which is passed through the porous collar of said seal is air.

7. The combination as defined in claim 5 in which the lubricant in said bearing is an Oil-Mist.

8. The combination as defined in claim 5 including a second fluid seal surrounding said shaft in proximity to the opposite side of said bearing, said second seal including a curved outer wall and first and second spaced circular side walls extending inwardly therefrom, said first circular side wall of the second seal being longer than its second circular side wall and having a circular offset portion, a circular porous collar having one end portion arranged within and secured to the circular offset portion of the first side wall and its other end portion engaging and being secured to the inner periphery of the second side wall of the second seal to form a channel for fluid passing through the porous collar of the second seal, means for maintaining said second seal in spaced relation to said shaft but in close tolerance therewith, the inner periphery of the first side wall of the second seal having an annular groove therein, and a circular plastic O-ring protruding from the groove in the inner periphery of the first side wall of the second seal which is in sliding engagement with said shaft during the rotation of said shaft to prevent fluid from the second seal from passing into said bearings.

9. The combination as defined in claim 8 in which the annular groove in the inner periphery of the second side wall of the first seal and the annular groove in the inner periphery of the first side wall of the second seal are both rectangular in shape and the O-ring in each of the grooves is sufficiently plastic to be compressed into the corners of the respective annular rectangularly-shaped grooves when the seals are forced around the shaft on the opposite sides of the bearings.

References Cited

UNITED STATES PATENTS

| | | | |
|---|---|---|---|
| 1,810,370 | 6/1931 | Ray | 308—36.3 |
| 1,957,054 | 5/1934 | Waldorf | 308—187 |
| 2,125,446 | 8/1938 | Hurtt | 277—82X |
| 2,299,119 | 10/1942 | Yeomans | 308—36.3 |
| 2,445,227 | 7/1948 | Le Clair | 308—P.M. |
| 2,937,294 | 5/1960 | Macks | 308—A |
| 3,001,806 | 9/1961 | Macks | 277—96X |
| 3,093,382 | 6/1963 | Macks | 277—96X |
| 3,113,810 | 12/1963 | Brusca | 308—187.1 |
| 3,286,792 | 11/1966 | Wall | 308—P.M. |
| 3,390,525 | 7/1968 | Spillmann | 308—36.3 |

M. CARY NELSON, Primary Examiner

W. S. RATLIFF, JR., Assistant Examiner

U.S. Cl. X.R.

277—71